_United States Patent_ [19]

Blancheton et al.

[11] Patent Number: 4,640,227

[45] Date of Patent: Feb. 3, 1987

[54] INTENSIVE SHRIMP BREEDING PROCESS

[75] Inventors: Jean-Paul Blancheton, Montpellier; Jacques Calvas, Noirmoutier; Alain H. Michel, Paris, all of France; Vincent Vonau, Papeete-Tahiti,

[73] Assignee: Institut Francais de Recherche pour l'Exploitation de la Mer - IFREMER, Paris, France

[21] Appl. No.: 810,987

[22] Filed: Dec. 19, 1985

[30] Foreign Application Priority Data

Dec. 20, 1984 [FR] France ................. 84 19753

[51] Int. Cl.$^4$ ............................................. A01K 61/00
[52] U.S. Cl. ......................................................... 119/2
[58] Field of Search ............................................. 119/2

[56] References Cited

U.S. PATENT DOCUMENTS 3,473,509 10/1969 Miyamura ............................... 119/2
3,601,094  8/1971 Kittaka ................................... 119/2
3,998,186 12/1976 Hodges ................................... 119/2
4,137,868  2/1979 Pryor ..................................... 119/2

FOREIGN PATENT DOCUMENTS 0086168 8/1983 European Pat. Off. .
2045060 2/1971 France .

_Primary Examiner_—Hugh R. Chamblee
_Attorney, Agent, or Firm_—Balogh, Osann, Kramer, Dvorak, Genova & Traub

[57] ABSTRACT

The invention relates to processes for intensive shrimp breeding, in tanks where a small proportion of the water is renewed, with a view to obtaining the growth of post-larvae more than 12-days old. Before placing the post-larvae in the tank, the water is prepared by filling up the tank progressively and adding daily to that water an artificial food containing nitrobenous organic products until flocs, formed of heterotroph and nitrifying bacteria and phytoplanktons, are obtined, serving as a complement of food to the shrimps which are fed with artificial food.

9 Claims, No Drawings

INTENSIVE SHRIMP BREEDING PROCESS

The present invention relates to a process for intensive shrimp breeding in tanks with low water turnover.

The technical sector of the invention is that of aquaculture.

Intensive shrimp breeding covers a weight of shrimps of between 300 g and 5 kg per cubic meter of water.

Heretofore intensive shrimp breeding in tanks has met up with a great number of difficulties.

From an economical standpoint, this type of breeding can only make profits if the shrimps can be fed with artificial food only and if the tank water does not have to be renewed in too great proportions.

Attempts at intensive shrimps breeding in those conditions have met up with two essential difficulties.

There is, in artificial foods, a deficiency in growth factors, such as the vitamins and oligo-elements essential to the development of shrimps. Moreover, the tank water, if changed only in small proportions becomes rapidly toxic for the shrimps, due to the wastes from animal metabolism such as $NH_4+$ and $NO_2-$ ions.

It has been tried to incorporate growth-promoting agents in artificial foodstuffs, but what is not known is, what agents are necessary to the different species of shrimps, or how to preserve in good state the growth-promoting agents incorporated in artificial foods.

It is the object of the present invention to make it possible to breed shrimps intensively in a tank where the water is renewed only in small proportions, and where only artificial food is brought, due to the development in the water of a feed chain, constituted of living organisms, which remains permanently sufficiently plentiful, despite the animal concentration, to act as a food complement therefor, by bringing them the growth-promoting agents essential to their development and to decompose the organic substances, while preventing the concentration of said substances from becoming toxic for the animals.

It is recalled at this stage that the natural sea water or river water which is used for filling shrimps breeding tanks, contains a variety of living micro-organisms which can be divided into three categories, depending on how they can feed themselves and pick up the energy essential to their metabolism. These categories are:

the photosensitive autotrophs, capable of synthesizing their organic matter from mineral compounds dissolved in the water, by using the light energy. This category contains in particular the photosynthetic bacteria and the phytoplankton;

the chemolithotrophs, capable of synthesizing their organic matter from mineral or organic compounds and drawing their energy from the oxidizing or from the reduction of mineral ions such as $NH_4+$, $NO_2-$, $NO_3-$, $SO_4--$. This category contains for example the nitrifying bacteria which oxidize the $NH_4+$ and $NO_2-$ ions, very toxic for the shrimps, into $NO_3-$ ions.

the heterotrophs which synthesize their organic substance from the organic matter of other living organisms and which draw their energy from the oxidizing of said organic matter. This particular category contains for example the zooplankton and a large number of bacteria.

In the natural environment, the presence and proliferation of these micro-organisms is essentially dependent on ecological conditions.

In an intensive shrimp breeding tank, the conditions of the medium must, before all, be compatible with the requirements of the shrimp metabolism, this imposing minimum temperature conditions and a content in dissolved oxygen and in live or inert organic matter, all of which conditions are specific for each species. Said conditions have to be kept up despite alteration of the medium due to the density of shrimps.

Also according to the processes of intensive shrimp breeding recommended by the invention, physicochemical conditions are created which make it possible to permanently keep a balance between the different living organisms contained in the tank water, so that a feed chain of living organisms can develop and is maintained in the tank throughout the duration of the intensive breeding program.

The object of the invention is reached with a process for intensive shrimp breeding in tanks in which, before placing the post-larvae of shrimps in the water, said water is prepared as follows:

the volume of water inside the tank is gradually filled up;

daily in that water, are added nitrogenous organic products, and the water is stirred, oxidized and kept at a temperature between 15° C. and 33° C., so that there occurs an important development of flocs formed of heterotroph and nitrifying bacteria and phytoplankton, which flocs are kept in suspension by the stirring of the water.

Once the tank has been filled with water and the flocs have formed, said flocs can be kept up either with a view to using the tank as a culture medium for seeding other tanks, or until post-larvae of shrimps are brought in.

To keep up the flocs, part of the water in the tank is replaced daily with a supply of natural water representing between 5% and 20% of the total volume of water, and the same quantity of nitrogenous organic substances continue to be brought daily into the water, which continues to be stirred and oxidized.

The time required to obtain a good flocculation depends on the temperature and can vary between 20 days and several months, in those cases where the tank is only filled with natural water, which is either sea water or fresh water, depending on whether sea water shrimps or fresh water shrimps are bred.

The minimum period required for preparing a breeding tank can be reduced to about ten days.

To this effect, at the beginning of the preparation, a sample of culture water called inoculum, taken from a flocculating culture tank, is added to the tank water.

According to a preferred method, the tank preparation phase lasts about ten days and consists in the following steps:

on the first day, a volume of water representing about 10% of the tank volume, and taken from the already prepared and flocculating culture tank, is introduced into the tank under preparation;

then a volume of fresh water or sea water (depending on the species of shrimp being bred), equal to about 10% of the tank volume, is added daily; and nitrogenous organic products are added daily in quantity varying between 1 g and 25 g/m3 of the water contained in the tank, the water is stirred and oxidized.

Advantageously, the nitrogenous organic products contain an inert nitrogenous product, preferably artificial food granules, in quantity varying between 0.5 g/m3 and 20 g/m3, and preferably about 2 g/m3 and live barm in quantity varying between 0.5 g/m3 and 10 g/m3, and preferably about 2 g/m3.

The processes according to the invention are intended for an intensive breeding of shrimps, which may be either sea water shrimps of the Penaeus type, for example the *Penaeus indicus, Penaeus monodon, Penaeus vanamei, Penaeus styliristris* or *Penaeus orientalis* species, or fresh water shrimps or prawn, for example the *Macrobrachium rosenbergii* species.

Understandably, the physico-chemical conditions (salinity, temperature, pH, etc. . . ) of the water in which the shrimps are bred, must meet the wellknown conditions, which vary from one species to another.

The breeding processes according to the invention are recommended for pre-growth and growth breeding. They are applied to post-larvae supplied from a hatchery between the twelfth and fifteenth day after hatching.

The breeding in question is an intensive breeding in tanks, namely a breeding in which the density of shrimps can vary between 300 g/m3 and 5 kg/m3. The quantity of post-larvae placed in the tanks can vary between two and twenty per litre of water.

The breeding tanks can have any volume and shape. They are exposed to daylight, which plays a part in the production of phytoplankton and zooplankton.

The conditions of numerous experiments conducted on several species of Penaeus type shrimps and on prawns are described hereinafter.

The breeding proper is preceded by a preparatory phase which is an essential step of the process according to the invention. The object of that preparatory phase is to create inside the tank a balanced and self-regulated ecosystem in which a feed chain of living organisms is produced, said organisms forming masses or flocs kept in suspension in the water.

The tank used in those experiments has a capacity of 10 m3, for example.

On the first day, about one cubic meter of water, namely 10% of the total volume of the tank, is poured into the tank, said water coming from another tank which is a culture tank prepared beforehand and which is flocculating, meaning that it contains flocs of living substance composed of bacteria and plankton which are maintained and kept in suspension.

The volume of water taken from the culture tank is used as seed for the tank in preparation in order to speed up that preparation. The seeding volume is designated by the term inoculum because it is used for inoculating the micro-organisms contained in the tank under preparation.

The culture tank may be a fresh water or a sea water tank. If it is a fresh water tank, an equal volume, namely 1 m3 of sea water is added, preferably, on the first day.

If on the contrary, the tank is a sea water tank, an equal volume of fresh water is added.

In both cases, the tank on the first day contains 2 m3 of water with a salinity rate of about 17%.

It should be noted that the introduction of an inoculum taken from a culture tank is not absolutely necessary in the process according to the invention. If no flocculating tank is available, it is quite possible to recreate flocs from natural water taken from the sea or from a river. In this case, flocculating time is longer, between twenty days and several months depending on the temperature and nature of the water.

The following days, the tank is gradually filled with sea water if sea shrimps are bred. Said water is untreated water collected close to a coast and which is only filtered, through a wide-mesh filter in order to protect the pumps. Everyday, one cubic meter of sea water, namely a volume equal to 10% of the total volume of the tank is added, so that the tank is full after about 9 days.

The temperature of the tank water is kept at between 15° C. and 33° C. The tank water is stirred constantly and oxidized by any of the known means, for example, by injecting compressed air bubbles into the water, either by recycling water re-injected into the tank after mixing it with air, for example by causing it to go through a diffuser, with a neck equipped with an air intake, or by mechanical stirring means coupled to compressed air injectors, etc. . .

Everyday, granules of an artificial food containing nitrogenous organic products are added to the tank water.

There is a great variety of suitable artificial food granules for example and non restrictively, granules based on fish meal, on soy bean flour, maize flour, on wheat gluten, on bran, optionally mixed with fish liver oil which brings unsaturated fatty acids.

Daily during the experiments, 2 g of artificial food granules and 2 g of live barm are added per m3 of water. The quantities of nitrogenous organic products may vary. The quantity of artificial food granule may be between 0.5 g/m3 and 20 g/m3.

The quantity of barm (*saccharomyces cerevisiae*) is between 0.5 g/m3 and 10 g/m3.

The total quantity of nitrogenous organic product constituted by the granules and the barm must be between 1 g and 25 g per m3 of water.

The barms serve as a food for the shrimps and for the zooplankton.

During the first days, heterotroph bacteria form in the water. Thereafter, the excreta from these bacteria ($NH_4+$, $CO_3-$, amino acids, vitamins) permit the development of nitrifying bacteria and phytoplankton. From then on, the organic matter forms masses shaped as flocs which contain particles of organic matter, heterotroph and nitrifying bacteria and phytoplankton. These flocs are kept in suspension by the stirring.

Experience has shown that, around the tenth day in a tank seeded at the beginning of the experiment, flocculation is sufficient and the intensive breeding program can be started, while keeping the system balanced, so that the flocs have both a nutrient function for the shrimps and for the zooplankton, the latter serving in turn as food for the shrimps, and a biological purifying function owing to the nitrifying bacteria. It is found, after ten days, that the quantity of zooplankton (Rotifera) is equal to about 3/ml.

After ten days, and after the preparation phase, the breeding phase is started by placing into the tank, twelve-days old post-larvae of shrimps supplied by a hatchery. The density of post-larvae is between 1 and 10 per liter.

Understandably, the physico-chemical conditions of the water (salinity, temperature, pH, etc. . . ) are kept to the wellknown values which correspond to the selected species of shrimp.

The only food brought in from the outside is constituted by artificial food granules containing nitrogenous organic products. Conventionally, the ratio of the weight brought in daily to the total weight of the shrimps, also called live weight, decreases gradually.

Said ratio is 100% during the first five days, then it is about 30% during the pre-growth phase, and decreases to 3% during the growth phase.

During the first five days of the conducted experiments, the post-larvae of the Penaeus type shrimps were fed with plastic-covered micro-particles, containing about 400 p.p.m. of an antisepetic which is furazolidone, the object of this being to reduce substantially the mortality among post-larvae during the first few days of the breeding program.

Also during the experiments, a weight of artificial food equal to 30% of the live weight is brought in daily until the shrimps reach a mean weight of 100 mg.

The ground artificial food had a granulometry of between 160 and 315μ, up to 5 mg of mean weight of shrimps; between 315 and 500μ, up to 20 mg mean weight, between 500 and 800μ, up to 50 mg of mean weight, and above 800μ, up to 100 mg of mean weight.

During the breeding phase, the water has to be renewed but this renewing operation must not be too important otherwise it could destroy the biological balance of the medium.

The quantity of natural water brought in daily is between 5% and 20% of the total capacity of the tank.

The processes according to the invention demand that, throughout the whole duration of the breeding program, the water be kept in physico-chemical conditions such that the flocs of living substance continue to develop and to fulfill their double function of complement of food for the shrimps and of biological purification of the water.

It is important to this effect to continue to bring everyday into the tank water, the same quantity of nitrogenous organic products while taking into account the food supplied to the shrimps.

During the first days of the breeding program, the post-larvae are very small and the weight of artificial food which is equal to the live weight, is low and clearly less than the minimum weight necessary to keep up the flocs. It is therefore necessary to complete and to bring everyday, into the tank, not only what is required to feed the shrimps but also a complement of nitrogenous organic products which is such that the total of the two reaches the weight necessary to keep up the flocculation.

For example, during the experiments, it was possible to keep up the flocculation during the preparation phase by bringing in daily 2 g/m3 of inert organic product and 2 g/m3 of barm, i.e. a total of 4 g/m3. If the density of post-larvae is 4/liter, whereas the mean weight of the post-larvae is less than 1 mg, the weight of artificial food brought in daily is less than 4 g/m3 and it is necessary to make up this value.

As soon as the weight of artificial food brought in daily exceeds 4 g/cm3, which occurs very rapidly due to the exponential growth of the shrimps, the supply of complementary nitrogenous organic product should be discontinued.

The artificial food which is given daily to the shrimps is then sufficient to keep up the biological balance and flocculation.

The feed chain in a breeding tank according to the invention is diagrammatically as follows.

The organic wastes rejected by the shrimps and the nitrogenous organic products are degraded by the heterotroph bacteria and entirely mineralized with carbon dioxide and ammonium ions.

The ammonia is oxidized by $NO_3$ nitrifying bacteria. Phytoplankton develops from $CO^2$, $NH_4$ and $NO_3$. This phytoplankton is consumed by the zooplankton. The shrimps consume the artificial food as well as some zooplankton and some phytoplankton.

During experiments of shrimp breeding in very sunny and hot climates, it was found that a large quantity of phytoplankton develops during the preparation phase, this preventing the formation of flocs.

To overcome this proliferation of phytoplankton, opaque covers were placed on top of the tanks during the preparation phase, this permitting a reduction of about 60% of the lighting of the tanks during daytime.

The following tables sum up the results of the numerous experiments on intensive breeding of shrimps conducted as far as the pre-growth stage. These experiments were conducted according to the process described hereinabove.

Column 1 of the tables indicate the density of post-larvae per liter, placed in the tank. These post-larvae are all about the same age, between 12 and 15 days after hatching of the eggs.

Column 2 indicates the final mean weight in mg.

Column 3 indicates the % rate of survival at the end of the breeding program.

Column 4 indicates the length of the breeding program inside the tank.

Column 5 indicates the conversion index Ic, namely the ratio of the total weight of artificial food supplied and the live weight at the end of the breeding program.

Column 6 indicates the minimum and maximum temperature of the water during the breeding program.

Column 7 indicates the minimum and maximum limits of the pH of the water.

Column 8 indicates the $NH_3$ content in mg/l.

Table 1 gives the results of a series of experiments carried out with Penaeus shrimps of the *Indicus* species.

Table 2 gives the results of a series of experiments carried out with Penaeus shrimps of the *Monodon* species.

Tables 3 gives the results of a series of experiments carried out with Penaeus shrimps of the *Vanamei* species.

Tables 4 gives the results of an experiment carried out with Penaeus shrimps of the *Stylirostris* species.

TABLE 1

| Penaeus Indicus Shrimps | | | | | | | |
|---|---|---|---|---|---|---|---|
| 1 Density in N/l | 2 Final mean weight mg | 3 % Survival | 4 Duration days | 5 Conversion Index | 6 Time min–max | 7 pH min–max | 8 $NH_3$ in mg/l |
| d = 2.2 | 150 | 45 | 29 | 1.7 | 29–32 | 7.7  8.7 | 2.73 |
| 2.5 | 105 | 87 | 28 | 2.3 | 26–31 | 7.8  8.2 | >0.7 |
| 4.5 | 100 | 52 | 36 | 2.5 | 22–26 | 7.9  8.3 | |
| 6.6 | 104 | 64 | 28 | 2.7 | 26–31 | 7.7  8.1 | >0.7 |
| 6.6 | 75 | 31 | 24 | 4.0 | 29–31 | 7.8  8.1 | 4.27 |
| 6.6 | 62 | 70 | 24 | 2.3 | 29–31 | 7.9  8.2 | 3.45 |

TABLE 1-continued

Penaeus Indicus Shrimps

| 1 Density in N/l | 2 Final mean weight mg | 3 % Survival | 4 Duration days | 5 Conversion Index | 6 Time min-max | 7 pH min-max | 8 NH₃ in mg/l |
|---|---|---|---|---|---|---|---|
| 6.6 | 90 | 79 | 24 | 2.0 | 29–31 | 7.6  8.1 | 4.14 |
| 6.9 | 115 | 56 | 28 | 1.3 | 28–33 | 7.7  8.8 | 3.38 |
| 10.0 | 90 | 20 | 30 | 1.4 | 24–26 | 7.8  8.2 | |
| 11.5 | 100 | 1 | 36 | 1.8 | 23–26 | 8.1  8.3 | 3.07 |

TABLE 2

Penaeus Monodon Shrimps

| 1 Density | 2 Final mean weight mg | 3 % Survival | 4 Duration days | 5 Conversion Index | 6 Time min-max | 7 pH min-max | 8 NH₃ in mg/l |
|---|---|---|---|---|---|---|---|
| 1.1 | 85 | 52 | P 34 | 7.4 | 27–31 | 8.1  8.8 | 2.9 |
| 1.6 | 420 | 15 | 65 | 3.1 | 26–31 | 7.8  8.8 | |
| 1.7 | 86 | 75 | 30 | 2.5 | 28–31 | 7.9  8.2 | 1.7 |
| 2.0 | 67 | 93 | 38 | 4.4 | 28–32 | 7.8  8.4 | 1.7 |
| 2.8 | 51 | 56 | 33 | | | | |
| 4.0 | 63 | 60 | 38 | 2.0 | 26–28 | 8.0  8.3 | |
| 5.0 | 20 | 0 | 16 | 00 | 26–31 | 7.5  8.4 | 2.0 |
| 5.0 | 113 | 21 | 49 | 3.7 | 26–28 | 8.0  8.5 | 3.0 |
| 6.0 | 70 | 56 | 38 | 3.8 | 26–30 | | |
| 6.5 | 150 | 17 | 48 | 9.2 | 27–32 | 7.7  8.6 | 5.6 |

TABLE 3

Penaeus Vanamei Shrimps

| 1 Density in N/l | 2 Final mean weight mg | 3 % Survival | 4 Duration days | 5 Conversion Index | 6 Time min-max | 7 pH min-max | 8 NH₃ in min-max |
|---|---|---|---|---|---|---|---|
| 1.0 | 131 | 100 | 38 | 0.7 | 25–27 | 8.2  8.4 | |
| 2.5 | 260 | 74 | 50 | | | | |
| | 15 | 66 | 35 | | 25–31 | 7.8  8.4 | 0.2  6.0 |
| 3.0 | 1800 | 42 | 103 | 3.9 | 25–31 | 7.8  8.4 | 0.2  6.0 |

TABLE 4

Penaeus Stylirostris Shrimps

| 1 Density in N/l | 2 Final mean weight mg | 3 % Survival | 4 Duration days | 5 Conversion Index | 6 Time min-max | 7 pH min-max | 8 NH₃ in min-max |
|---|---|---|---|---|---|---|---|
| 0.2 | 1500 | 100 | 50 | 2.2 | 28–30 | 7.6  8.7 | |

The experiments carried out with the *Indicus* species have shown that mean survival at the end of the breeding program is about 42%, the mean conversion index is 2.2 and that it was possible to reach a mean weight of 100 mg in about 28 days. The mean weight gain of the shrimps is about 30%.

The experiments carried out with the *Minodon* species show a mean survival at the end of the breeding program of around 40%, a mean conversion index of 4.7. It is possible to reach a mean weight of 100 mg in 38 to 40 days. The mean weight gain is about 15%.

The experiments carried out with the *Vanamei* species have shown that a mean weight of 100 mg was reached in 43 days. Survival rate is about 70%.

The experiment with the *Stylirostris* species was carried out with a very small density of larvae, 0.2/liter and survival was 100%. A mean rate of 100 mg was reached in 24 days.

What is claimed is:

1. A process for the intensive breeding of shrimps in tanks where only a small proportion of the water is renewed, with a view to obtaining the pre-growth or the growth of post-larvae more than twelve-days old, by feeding them with artificial food, process wherein before placing the post-larvae in the tank water, said water is prepared by topping up progressively the volume of water in the tank and adding daily to said water an artificial food containing nitrogenous organic products, then the water is stirred, oxidized, and its temperature is kept to between 15° C. and 33° C. until an important formation of flocs is obtained, said flocs being made up of heterotroph and nitrifying bacteria and phytoplankton and being kept in suspension in the water, after that post-larvae of shrimps are introduced into the tank containing said flocs and are fed with artificial food.

2. A process as claimed in claim 1, wherein once the tank is filled with water, a volume of water representing between 5% and 20% of the total volume is renewed daily and the same quantity of nitrogenous organic products continue to be brought in daily, the water being kept under stirring and oxidized, the effect of this being to keep up the flocs.

3. A process as claimed in claim 1, used in the case where the breeding tanks are situated in a very sunny area, wherein during the preparation phase, the natural lighting of the tanks is reduced in order to prevent the proliferation of the toplankton.

4. A process as claimed in claim 1, wherein the tank water is seeded at the beginning of the preparation, with an inoculum taken from another already prepared tank containing flocs, this reducing the period necessary to the formation of said flocs.

5. A process as claimed in claim 4, wherein the water preparation phase lasts about ten days and consists in the following steps:
   on the first day, seeding the tank with a volume of water which is about 10% of the total volume of the tank, and which is taken from a culture tank already prepared and containing flocs;
   then adding daily into said tank a volume of fresh water or sea water, depending on the species of shrimps to be bred, equal to about 10% of the tank capacity;
   adding daily nitrogenous organic products in quantity varying between 1 g and 25 g per cubic meter of water contained in the tank;
   stirring and oxidizing the water.

6. A process as claimed in claim 5, wherein said nitrogenous organic products comprise:
   an inert nitrogenous product, preferably artificial food granules, in quantity varying between 0.5 g/m3 and 20 g/m3 and preferably about 2 g/m3, and living barm in quantity varying between 0.5 g/m3 and 10 g/m3 and preferably about 2 g/m3.

7. A process as claimed in claim 5, wherein, on the first day, an equal volume of sea water is added to the inoculum taken from the culture tank if the latter is a fresh water tank, and an equal volume of fresh water is added if said tank is a sea water tank.

8. A process as claimed in claim 1, wherein, after the flocs have formed, post-larvae of shrimps are introduced into the tank water, and:
   said tank water is renewed by bringing in daily a volume of untreated water, either fresh water or sea water depending on the species of shrimp bred, said volume being between 5% and 20% of the tank capacity;
   the shrimps are fed by bringing in daily a quantity of artificial food containing nitrogenous organic products, which quantity vary progressively from 100% of the weight of post-larvae during the first five days down to 3% of the weight of shrimp at the end of the breeding program;
   and as long as the weight of artificial food does not reach the quantity of nitrogenous organic product necessary to keep up flocculation, said weight is made up until said quantity is reached.

9. A process as claimed in claim 8, wherein the shrimps are fed with encapsulated granules of artificial food, and during the first five days of the breeding program, encapsulated food containing furazolidone is used.

* * * * *